United States Patent
Ueda et al.

(10) Patent No.: US 10,658,885 B2
(45) Date of Patent: May 19, 2020

(54) MOTOR AND MANUFACTURING METHOD OF MOTOR

(71) Applicant: Nidec Corporation, Kyoto (JP)

(72) Inventors: Tomoya Ueda, Kyoto (JP); Hiroshi Kitagaki, Kyoto (JP); Takeshi Honda, Kyoto (JP)

(73) Assignee: Nidec Corporation, Kyoto (JP)

( * ) Notice: Subject to any disclaimer, the term of this patent is extended or adjusted under 35 U.S.C. 154(b) by 83 days.

(21) Appl. No.: 15/770,245

(22) PCT Filed: Nov. 22, 2016

(86) PCT No.: PCT/JP2016/084519
§ 371 (c)(1),
(2) Date: Apr. 23, 2018

(87) PCT Pub. No.: WO2017/090571
PCT Pub. Date: Jun. 1, 2017

(65) Prior Publication Data
US 2018/0309330 A1    Oct. 25, 2018

(30) Foreign Application Priority Data

Nov. 27, 2015 (JP) .................................. 2015-232347

(51) Int. Cl.
*H02K 1/18* (2006.01)
*H02K 1/14* (2006.01)
(Continued)

(52) U.S. Cl.
CPC ............. *H02K 1/146* (2013.01); *H02K 1/148* (2013.01); *H02K 1/278* (2013.01); *H02K 15/022* (2013.01);
(Continued)

(58) Field of Classification Search
CPC .. H02K 1/00; H02K 1/02; H02K 1/14; H02K 1/146; H02K 1/148; H02K 1/16;
(Continued)

(56) References Cited

U.S. PATENT DOCUMENTS

| 2006/0049713 A1* | 3/2006 | Toide ..................... H02K 1/187 |
| | | 310/216.057 |
| 2010/0237726 A1* | 9/2010 | Hayakawa ............. H02K 1/148 |
| | | 310/64 |

(Continued)

FOREIGN PATENT DOCUMENTS

| JP | 56-91654 A | 7/1981 |
| JP | 08-47185 A | 2/1996 |

(Continued)

OTHER PUBLICATIONS

Official Communication issued in International Patent Application No. PCT/JP2016/084519, dated Feb. 14, 2017.

(Continued)

*Primary Examiner* — Tran N Nguyen
(74) *Attorney, Agent, or Firm* — Keating & Bennett (57) ABSTRACT

A motor includes a rotor that rotates centered on a central axis extending in an axial direction, and a stator. The stator includes a stator iron core in which a plurality of laminated iron cores each including a tooth portion extending in a radial direction are arranged in a circumferential direction, and coils wound around the tooth portion. The laminated iron core includes a plurality of flat plate-shaped iron core pieces laminated in a plate thickness direction. The iron core piece is made of a non-oriented electromagnetic steel plate. A rolling direction of the iron core piece is inclined with respect to the radial direction. The laminated iron core is preferably formed by laminating the iron core pieces to be arranged with a same inclination. At least a pair of the (Continued)

laminated iron cores adjacent to each other in the circumferential direction has inclinations opposite to each other.

11 Claims, 10 Drawing Sheets

(51) Int. Cl.
  *H02K 29/03* (2006.01)
  *H02K 15/02* (2006.01)
  *H02K 1/27* (2006.01)
(52) U.S. Cl.
  CPC ......... *H02K 29/03* (2013.01); *H02K 2201/06* (2013.01); *H02K 2213/03* (2013.01)
(58) Field of Classification Search
  CPC .. H02K 1/18; H02K 1/22; H02K 1/27; H02K 1/278; H02K 15/00; H02K 15/02; H02K 15/022; H02K 29/00; H02K 29/03
  See application file for complete search history.

(56) References Cited

U.S. PATENT DOCUMENTS

| | | | |
|---|---|---|---|
| 2010/0270100 A1* | 10/2010 | Ikeno | B62D 5/0403 180/443 |
| 2011/0047780 A1* | 3/2011 | Akita | H02K 1/148 29/527.1 |
| 2011/0140566 A1* | 6/2011 | Nakahara | H02K 1/02 310/216.018 |

FOREIGN PATENT DOCUMENTS

| | | |
|---|---|---|
| JP | 08-223830 A | 8/1996 |
| JP | 2004-068084 A | 3/2004 |
| JP | 2004-242495 A | 8/2004 |
| JP | 2014155347 * | 8/2014 |

OTHER PUBLICATIONS

Pei, "Smelting of Alloy Steel", Metallurgical Industry Press, Oct. 1992, 11 pages.

* cited by examiner

MOTOR AND MANUFACTURING METHOD OF MOTOR

BACKGROUND OF THE INVENTION

1. Field of the Invention

The present disclosure relates to a motor and a manufacturing method of a motor.

2. Description of the Related Art

In the related art, a motor including a laminated iron core configured by laminating oriented electromagnetic steel plates is known.

It is possible to reduce a cogging torque and a torque ripple with the laminated iron core using oriented electromagnetic steel plates. However, if analysis is performed with a detailed shape of a tooth portion taken into consideration by an analysis method developed recently, the cogging torque may not be improved in the motor using the oriented electromagnetic steel plates in the laminated iron core. The tooth portion has a portion (umbrella portion) spreading to a tip on a rotor side facing a permanent magnet. Since magnetic properties of the oriented electromagnetic steel plate have strong directionality, a direction of a magnetic flux passing through the tooth portion is strongly limited. Therefore, the magnetic flux passing through the tooth portion from a side surface of the umbrella portion in a circumferential direction is limited, and the cogging torque and the torque ripple may increase. Furthermore, the oriented electromagnetic steel plate is expensive and difficult to press, and there is a demand for a technique for reducing the cogging torque and the torque ripple by using non-oriented electromagnetic steel plates.

SUMMARY OF THE INVENTION

A motor of a preferred embodiment of the present invention includes a rotor that rotates centered on a central axis extending in an axial direction; and a stator. The stator includes a stator iron core in which a plurality of laminated iron cores each including a tooth portion extending in a radial direction are arranged in a circumferential direction, and coils wound around the tooth portions. The laminated iron core includes a plurality of flat plate-shaped iron core pieces laminated in a plate thickness direction. The iron core piece is made of a non-oriented electromagnetic steel plate. A rolling direction of the iron core piece is inclined with respect to the radial direction. The laminated iron core is defined by laminating the iron core pieces to be arranged with a same inclination. At least a pair of the laminated iron cores adjacent to each other in the circumferential direction have inclinations opposite to each other.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, motors according to preferred embodiments of the present invention will be described with reference to the drawings. Moreover, the scope of the disclosure is not limited to the following preferred embodiments and can be arbitrarily changed within a range of a technical idea of the disclosure. In addition, in the following drawings, in order to make each configuration easy to understand, an actual structure, and a scale, the number, or the like in each structure may be different.

In addition, in the drawings, a Z axis parallel to a central axis J is illustrated. A Z-axis direction is an up and down direction. In addition, unless otherwise specified, in the following description, a radial direction centered on the central axis J extending in the up and down direction (Z-axis direction) is simply referred to as an "radial direction", and a circumferential direction centered on the central axis J, that is, an axis around the central axis J is simply referred to as a "circumferential direction", a direction (that is, the upward and downward direction or the Z-axis direction) parallel or substantially parallel to the central axis J is referred to as an axial direction.

Moreover, in the description of preferred embodiments of the present specification, the phrase "extending in the axial direction" not only includes a case of strictly extending in the direction parallel to the central axis J but also includes a case of extending in a direction inclined in a range of less than about 45 degrees with respect to the axial direction.

Moreover, in the description of preferred embodiments of the present specification, the phrase "extending in the radial direction" not only includes a case of strictly extending in the radial direction, that is, extending in a direction perpendicular to the upward and downward direction (Z-axis direction) but also includes a case of extending in a direction inclined in a range of less than about 45 degrees with respect to the radial direction.

Figure 1:
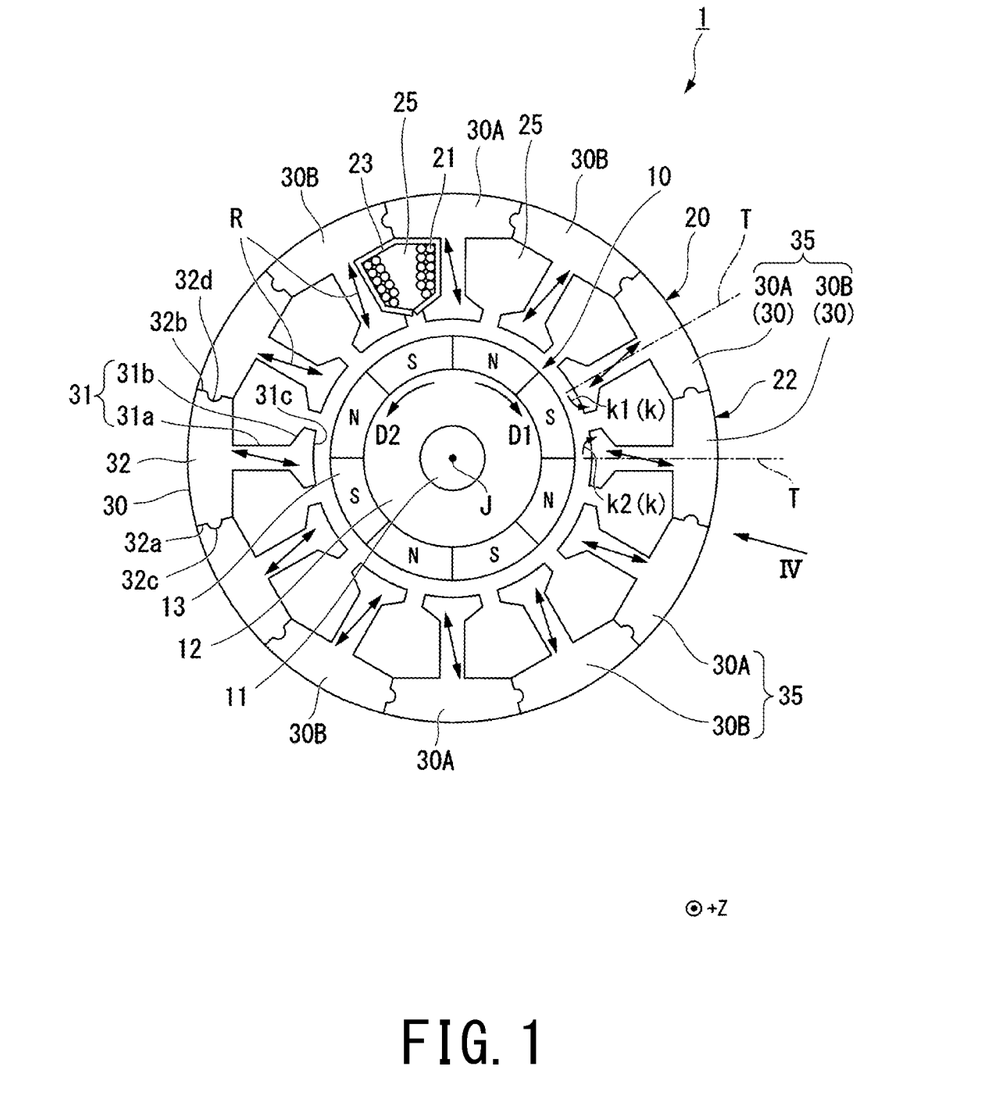
FIG. 1 is a schematic sectional view of a motor of a preferred embodiment of the present invention.

FIG. 1 is a schematic sectional view of a motor of a preferred embodiment of the present invention. A motor 1 of a preferred embodiment of the present invention is an inner rotor brushless motor including 8 poles and 12 slots, for example. The motor 1 includes a rotor 10 and a stator 20.

The rotor 10 rotates centered on the central axis J extending in the axial direction (Z-axis direction). The rotor 10 preferably includes a shaft 11, a rotor core 12, and a rotor magnet (permanent magnet) 13.

The shaft 11 has a cylindrical shape centered on the central axis J extending in one direction (Z-axis direction). The shaft 11 is rotatable around an axis by a bearing (not illustrated). The rotor core 12 surrounds the shaft 11 around the axis and is fixed to the shaft 11. The rotor magnet 13 is fixed to an outer surface of the rotor core 12 along the axis of the rotor core 12. The rotor magnet 13 is preferably a permanent magnet including eight poles in the circumferential direction, for example. The rotor core 12 and the rotor magnet 13 rotate integrally with the shaft 11.

The stator 20 has a cylindrical shape and surrounds the rotor 10 from an outside in the radial direction. The stator 20 preferably includes a stator iron core 22, an insulator 23, and a coil 21.

The stator iron core 22 preferably includes twelve laminated iron cores 30. That is, the number of the laminated iron cores 30 preferably is an even number. The twelve laminated iron cores 30 are arranged in the circumferential direction. Each of the laminated iron cores 30 includes a core back portion 32 extending in the circumferential direction and a tooth portion 31 extending from the core back portion 32 to an inside in the radial direction.

The core back portion 32 includes a first circumferential end surface 32a positioned on one side in the circumferential direction and a second circumferential end surface 32b positioned on the other side in the circumferential direction. The first circumferential end surface 32a includes a protruding portion 32c that protrudes in the circumferential direction. The second circumferential end surface 32b includes a recessed portion 32d that is recessed in the circumferential direction. The protruding portion 32c and the recessed portion 32d have shapes which are reversed to each other with respect to the circumferential end surfaces 32a and 32b. In the laminated iron cores 30 adjacent to each other in the circumferential direction, the first circumferential end surface 32a and the second circumferential end surface 32b are opposite to each other and joined. The protruding portion 32c and the recessed portion 32d of the adjacent laminated iron cores 30 are fitted.

The tooth portion 31 preferably includes a tooth base portion 31a extending from a center of the core back portion 32 in the circumferential direction and an umbrella portion 31b positioned at a tip of the tooth base portion 31a. The umbrella portion 31b has a shape extending to both sides with respect to the tooth base portion 31a in the circumferential direction. The umbrella portion 31b includes a facing surface 31c facing the rotor magnet 13. The facing surface 31c preferably has a curved arc shape along an outer peripheral surface of the rotor 10 when viewed from the axial direction.

The stator iron core 22 is preferably provided with a plurality of slots 25 (preferably twelve slots 25, for example). The slot 25 is a region surrounded by side surfaces of two tooth portions 31 adjacent to each other in the circumferential direction and an inner surface of the core back portion 32.

The insulator 23 is provided in the slot 25. The insulator 23 may include an insulating member (not illustrated) covering both surfaces of the tooth portion 31 in the axial direction. The coil 21 is wound around the tooth portion 31 via the insulator 23.

Figure 2:
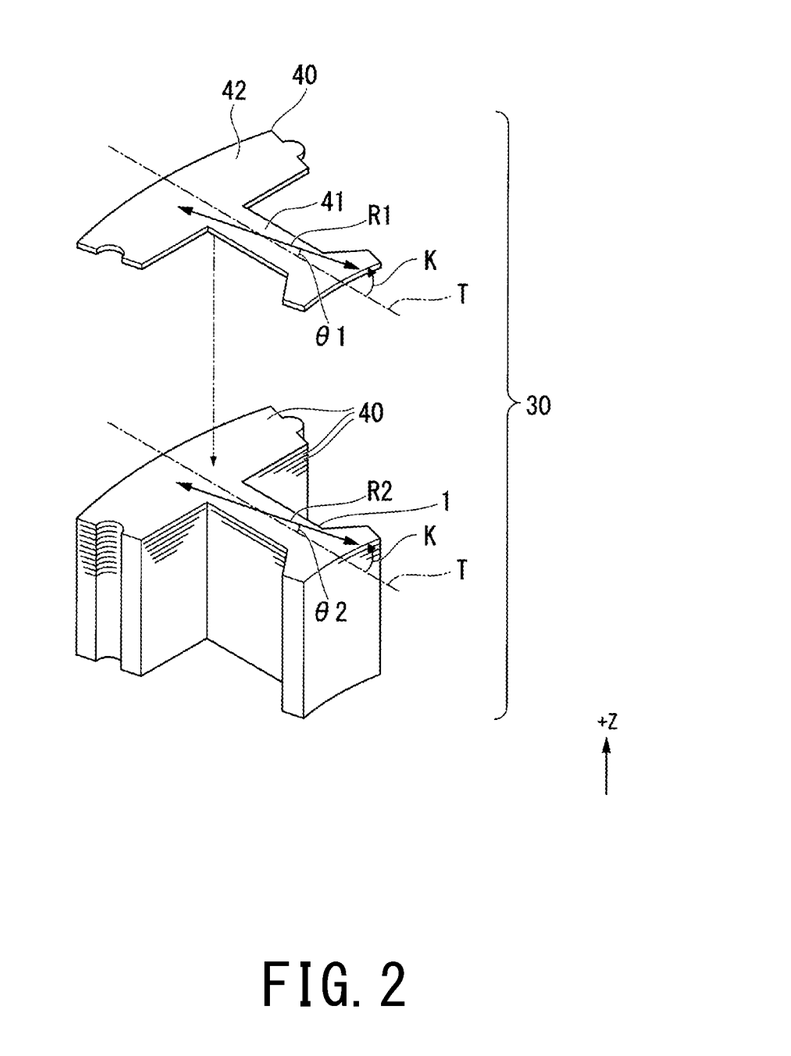
FIG. 2 is a perspective view of a laminated iron core of a preferred embodiment of the present invention.

Next, the laminated iron core 30 will be described in detail. FIG. 2 is a perspective view of the laminated iron core 30. As illustrated in FIG. 2, the laminated iron core 30 includes a plurality of iron core pieces 40. The plurality of the iron core pieces 40 are preferably flat plate-shaped and have the same shape or substantially the same shape. Since the iron core pieces having the same shape or substantially the same shape are laminated in a plate thickness direction, the laminated iron core 30 preferably has a uniform shape or substantially uniform shape along the axial direction.

The iron core piece 40 preferably includes an element tooth portion (the tooth portion) 41 and an element core back portion 42. The element tooth portion 41 defines the tooth portion 31 of the laminated iron core 30 by laminating the iron core pieces 40. Similarly, the element core back portion 42 defines the core back portion 32 of the laminated iron core 30 by laminating the iron core pieces 40.

The iron core piece 40 is preferably made of a non-oriented electromagnetic steel plate. Here, the non-oriented electromagnetic steel plate is preferably the same as the non-oriented electromagnetic steel strip standardized in JIS C 2552 (corresponding to IEC 60404-8-4) revised in 2014, for example. The non-oriented electromagnetic steel plate is a steel plate of which a maximum value of anisotropy of iron loss is smaller than a threshold value defined by JIS and does not have remarkable directionality in the magnetic properties. However, since the non-oriented electromagnetic steel plate is preferably a rolled plate, it has a directionality of the threshold value or less defined in JIS and has a characteristic of being easily magnetized in a rolling direction R1. That is, the iron core piece 40 has an easy magnetization direction R1 and the easy magnetization direction R1 coincides with the rolling direction R1.

As illustrated in FIG. 2, a direction in which the element tooth portion 41 extends is a tooth direction T. The rolling direction R1 of the iron core piece 40 preferably is inclined k with respect to the tooth direction T. An angle defined by the inclination k and the tooth direction T is an inclination angle θ1. In the present preferred embodiment, since the tooth direction T coincides with the radial direction of the motor 1, the rolling direction R1 has the inclination k with respect to the radial direction. The inclination angle θ1 of the rolling direction R1 with respect to the tooth direction T is larger than 0° and smaller than about 90°. Here, if an arbitrary inclination angle θ is in a range larger than 0° and smaller than about 90°, it is assumed that the inclination k is the same as the inclination angle θ1. On the other hand, the arbitrary inclination angle θ is in a range larger than about 90° and smaller than about 180°, it is assumed that the inclination k is not the same as the inclination angle θ1.

The laminated iron core 30 is preferably defined by laminating the iron core pieces 40 having the same inclination k. The laminated iron core 30 has an easy magnetization direction R defined by composition of the rolling directions R1 and R2 (R3, R4, ... ) of each iron core piece 40. The easy magnetization direction R has the inclination k defined by composition of the inclination angles θ1 and θ2 (θ3, θ4, ... ) of each iron core piece. In the present preferred embodiment, the inclination angle θ1 of the rolling direction R1 and the inclination angle θ2 of the rolling direction R2 of the iron core pieces 40 included in the single laminated iron core 30 coincide with each other (in FIG. 2, θ1=θ2). Therefore, the inclination k of the easy magnetization direction R of the laminated iron core 30 coincides with the inclinations k of the rolling direction R1 and the rolling direction R2 of the iron core pieces 40.

Moreover, the inclination angle θ1 of the rolling direction R1 and the inclination angle θ2 of the rolling direction R2 of the plurality of the iron core pieces 40 included in the single laminated iron core 30 may be different (in FIG. 2, θ1≠θ2). In this case, if the inclination k of the rolling direction R1 and the inclination k of the rolling direction R2 of the iron core pieces 40 are the same, even if the inclination angles θ1 and θ2 are different, the inclinations k of the laminated iron core 30 coincides with each other.

In addition, the iron core pieces 40 having different inclination directions may be included in the single laminated iron core 30. In this case, the easy magnetization direction R of the laminated iron core 30 obtained by the composition of the inclination angles θ1 and θ2 (θ3 and θ4, . . . ) of each iron core piece may have an inclination in a predetermined direction with respect to the tooth direction T. Similarly, the single laminated iron core 30 may include the iron core piece 40 of which the rolling direction R1 does not have an inclination with respect to the tooth direction T. However, it is preferable that the rolling direction R1 of the iron core piece 40 included in the single laminated iron core 30 coincides with the inclination direction with respect to the tooth direction T. Therefore, the easy magnetization direction R of the laminated iron core 30 is able to be reliably inclined in a predetermined direction with respect to the tooth direction T.

As illustrated in FIG. 1, the twelve laminated iron cores 30 defining the stator iron core 22 respectively have the easy magnetization direction R. The twelve laminated iron cores 30 are classified into a first laminated iron core 30A and a second laminated iron core 30B which are different in the direction of the inclination k of the easy magnetization direction R with respect to the radial direction. The inclination k of the first laminated iron core 30A is referred to as a first inclination k1 and the inclination k of the second laminated iron core 30B is referred to as a second inclination k2. The first inclination k1 extends from a base side to a tip side of the tooth portion 31 and is inclined toward a first rotation direction D1 of the rotor that is the clockwise direction. That is, the first inclination k1 is inclined toward one side. The second inclination k2 extends from the base side to the tip side of the tooth portion 31 and is inclined toward a second rotation direction D2 of the rotor that is the counterclockwise direction. That is, the second inclination k2 is inclined toward the other side. The numbers of the first laminated iron cores 30A and the second laminated iron cores 30B are the same. In the present preferred embodiment, the numbers of the first laminated iron cores 30A and the second laminated iron cores 30B are preferably respectively six, for example. The first laminated iron core 30A and the second laminated iron core 30B are alternately arranged in the circumferential direction. That is, a pair of the laminated iron cores 30A and 30B adjacent to each other in the circumferential direction has the inclinations k opposite to each other.

As illustrated in FIG. 1, the first laminated iron core 30A and the second laminated iron core 30B adjacent to each other configure a laminated iron core pair 35. In the laminated iron core pair 35, in the first laminated iron core 30A and the second laminated iron core 30B, the easy magnetization direction R of one side is inclined toward the other side from the base side to the tip side of the tooth portion 31. In other words, when the first laminated iron core 30A, the slot 25, and the second laminated iron core 30B are aligned in the circumferential direction in the order, each of the easy magnetization directions R of the first laminated iron core 30A and the second laminated iron core 30B is inclined from the base side to the tip side of the tooth portion 31 toward the slot 25 side. In addition, in the first laminated iron core 30A and the second laminated iron core 30B belonging to different laminated iron core pairs 35 and adjacent to each other, the easy magnetization direction R of one side is inclined to a side opposite to the other side from the base side to the tip side of the tooth portion 31. In other words, when the second laminated iron core 30B, the slot 25, and the first laminated iron core 30A are aligned in the circumferential direction in the order, each of the easy magnetization directions R of the first laminated iron core 30A and the second laminated iron core 30B is inclined from the base side to the tip side of the tooth portion 31 to the side opposite to the slot 25.

According to the motor 1 of the present preferred embodiment, it is possible to reduce a magnetic discontinuity between the adjacent tooth portions 31 and to reduce a cogging torque and the torque ripple.

In a general motor, the number of magnetic flux penetrating the coil is maximized in a case where an N pole or an S pole of the rotor is positioned on a facing surface of the umbrella portion of the tooth portion. In addition, the number of magnetic flux penetrating the coil is significantly reduced or minimized in a case where the N pole or the S pole of the rotor is positioned between the tooth portions (that is, a front surface of the slot). When the N pole or the S pole passes through the front surface of the slot 25 from the front surface of the tooth portion 31, and moves to the front surface of the adjacent tooth portion 31, the magnetic discontinuity occurs, and the cogging torque and the torque ripple occur.

On the other hand, according to the motor 1 of the present preferred embodiment, in the laminated iron core pair 35, the easy magnetization directions R of the first and second laminated iron cores 30A and 30B are inclined toward the other side with respect to the tooth direction T. Therefore, in the laminated iron core pair 35, the first and second laminated iron cores 30A and 30B are easily magnetized by suppressing iron loss and a magnetic saturation with respect to the magnetic flux in the direction inclined to the tooth portion 31 side of each other. Therefore, the magnetic flux penetrating the coil 21 gently fluctuates and the magnetic discontinuity is able to be reduced in a case where the N pole or the S pole is positioned between the tooth portions 31 (front surface of the slot 25) of the laminated iron core pair 35. In addition, paying attention to the first and second laminated iron cores 30A and 30B belonging to different laminated iron core pairs 35 and adjacent to each other, the easy magnetization directions R of the tooth portions 31 of each other are included to the other side with respect to the tooth direction T. Therefore, when the N pole or the S pole of the rotor 10 passes between the tooth portions, the magnetic flux penetrating the coil 21 gently fluctuates and the magnetic discontinuity is able to be reduced.

As described above, the magnetic discontinuity between the tooth portions 31 is reduced so that it is possible to reduce peak values of the cogging torque and the torque ripple.

According to the motor 1 of the present preferred embodiment, since the laminated iron core 30 is defined by the non-oriented electromagnetic steel plates, it is easily magnetized in directions other than the easy magnetization direction R. Therefore, in the umbrella portion 31b of the tooth portion 31, the magnetic flux easily passes also from a side surface in the circumferential direction. Therefore, even in a case where the rotor 10 rotates and the direction of the magnetic flux that tries to pass through the tooth portion 31 variously changes, the magnetic discontinuity in the tooth portion 31 accompanying rotation hardly occurs and it is possible to reduce the torque ripple.

The non-oriented electromagnetic steel plate is inexpensive as compared to the oriented electromagnetic steel plate and punching by pressing is relatively easy. The laminated iron core 30 is made of the non-oriented electromagnetic steel plates so that the motor 1 is able to be provided at low cost.

Moreover, in the motor 1, in a plurality of the laminated iron cores 30, if the inclinations k of at least a pair of the laminated iron cores 30 adjacent to each other in the circumferential direction are reversed, it is possible to reduce the cogging torque and the torque ripple. Therefore, for example, excluding the pair of the laminated iron cores 30, the easy magnetization direction R of the other laminated iron core 30 may coincide with the tooth direction T.

In the motor 1 of the present preferred embodiment, the number of the first laminated iron cores 30A and the number of the second laminated iron cores 30B are preferably the same. Therefore, even when the rotor 10 rotates in either of the first rotation direction D1 and the second rotation direction D2, it is possible to reduce the peak values of the cogging torque and the torque ripple.

In the motor 1 of the present preferred embodiment, the stator iron core 22 includes the first laminated iron core 30A of which the inclination k is one side (first inclination k1) and the second laminated iron core 30B of which the inclination k is the other side (second inclination k2) which are disposed alternately in the circumferential direction. In addition, the number of the laminated iron cores 30 is an even number. Therefore, it is possible to provide the motor 1 in which an effect of reducing the cogging torque and the torque ripple hardly depending on the rotation direction of the rotor 10. The motor 1 is suitable as a motor to rotate the rotor 10 in either direction.

Figure 3:
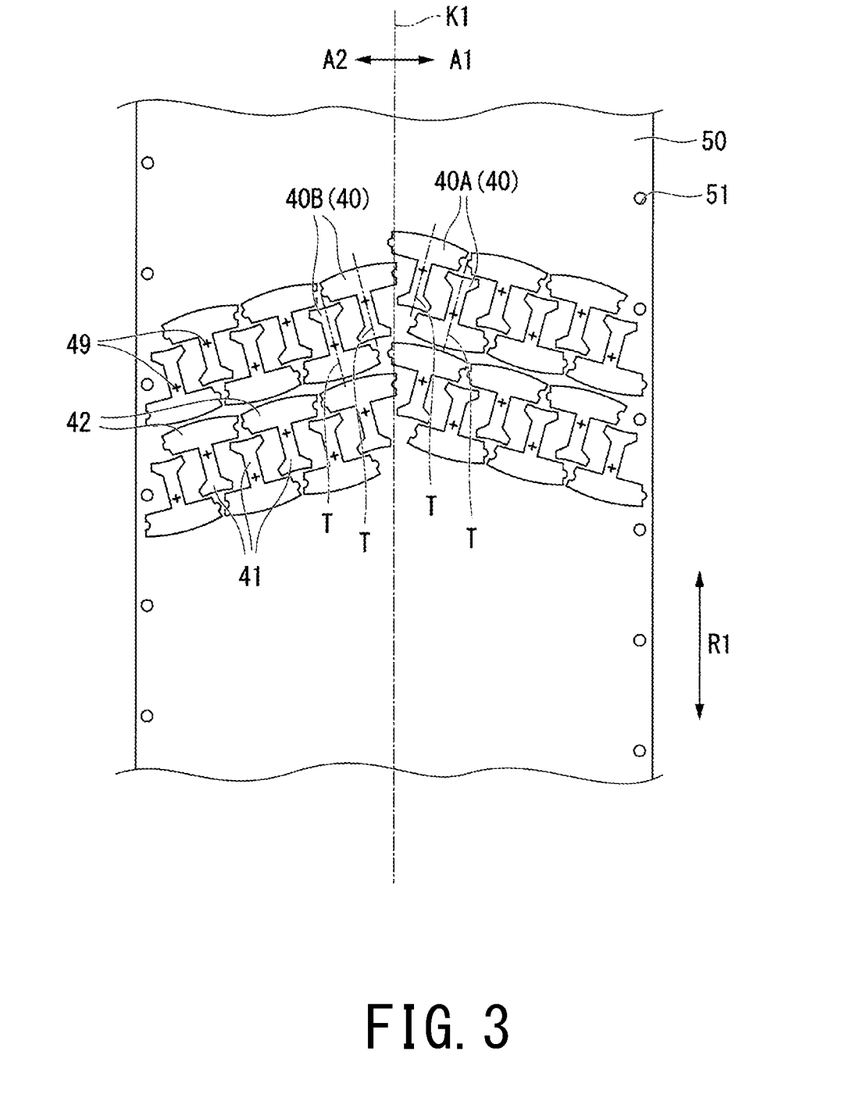
FIG. 3 is a schematic view illustrating an example of a die configuration used in punching an iron core piece of a preferred embodiment of the present invention.

Next, a non-limiting example of a manufacturing method of the motor 1 will be described. First, a step (first step) of forming the iron core piece 40 will be described. FIG. 3 is a schematic view illustrating an example of a die configuration when the iron core piece 40 is punched from a band plate 50. In FIG. 3 and the following description, the iron core piece 40 included in the first laminated iron core 30A is referred to as a first iron core piece 40A and the iron core piece 40 included in the second laminated iron core 30B of FIG. 1 is referred to as a second iron core piece 40B.

First, the band plate 50 made of the non-oriented electromagnetic steel plate is prepared. The band plate 50 made of the non-oriented electromagnetic steel plate extends in a longitudinal direction which coincides with the rolling direction R1 and in a width direction orthogonal to the rolling direction R1. A transporting direction of the band plate 50 is the longitudinal direction and the band plate 50 is transported by a transporting device (not illustrated). Pilot holes 51 are provided at both end portions of the band plate 50 in the width direction at equal intervals. A pilot (not illustrated) of the transporting device is inserted into the pilot hole 51 and transmission and alignment are performed by the pilots.

Next, the band plate 50 includes caulking holes 49 preferably formed, for example, by a punch device (not illustrated). The caulking holes 49 are provided to join the laminated iron core pieces 40 to each other in a step (second step) of forming the laminated iron core 30 described later. In the present preferred embodiment, one caulking hole 49 is provided for one iron core piece 40.

Next, the iron core piece 40 is punched out from the band plate 50. As illustrated in FIG. 3, the band plate 50 is provided with a reference line K1 extending in the longitudinal direction (that is, the rolling direction R1) of the band plate 50. The reference line K1 passes through the center of the band plate 50 in the width direction. The reference line K1 divides the band plate 50 into a first region A1 of one side (right side of a paper surface of FIG. 3) in the width direction and a second region A2 of the other side (left side of the paper surface of FIG. 3) in the width direction.

A plurality of the first iron core pieces 40A are punched out from the first region A1 and a plurality of the second iron core pieces 40B are punched out from the second region A2. The tooth directions T of the plurality of the first iron core pieces 40A are disposed in parallel in the first region A1. Similarly, the tooth directions T of the plurality of the second iron core pieces 40B are disposed in parallel or substantially in parallel in the second region A2. The first iron core piece 40A and the second iron core piece 40B are punched out from the band plate 50 with the inclination k of the tooth direction T with respect to the reference line K1 being opposite to each other. Moreover, a portion of the iron core pieces 40A and 40B which are punched out from the first region A1 and the second region A2 overlaps with the reference line K1.

The iron core piece 40, in which the rolling direction (easy magnetization direction) R1 is inclined with respect to the tooth direction T, can be formed through punching by inclining a direction in which the element tooth portion 41 is extended with respect to the rolling direction R1 of the band plate 50. In addition, the iron core pieces 40 are disposed so that the first region A1 and the second region A2 are different in the tooth direction T. Therefore, the first iron core piece 40A and the second iron core piece 40B having the rolling directions R1 inclined in different directions with respect to the tooth direction T can be formed. In a case where the same number of the first iron core piece 40A and the second iron core piece 40B is to be formed, it is preferable that the reference line K1 dividing the first region A1 and the second region A2 is provided at the center of the band plate 50 in the width direction. Therefore, it is possible to easily form the same number of the first and second iron core pieces 40A and 40B by setting areas of the first region A1 and the second region A2 to be the same.

In the first region A1 and the second region A2, the plurality of the iron core pieces 40 are disposed in a row that is inclined in the width direction of the band plate 50. In addition, rows of the iron core pieces 40 positioned in front and back (upper and lower sides of the paper surface of FIG. 3) of the rolling direction R1 of the band plate 50 are disposed to face each other, and a direction in which the tooth portion 41 extends is reversed back and forth. The element tooth portions 41 of the iron core pieces 40 arranged in the opposite row are positioned between the element tooth portions 41 of the iron core pieces 40 arranged in a row in the width direction.

In the first region A1 and the second region A2, it is possible to increase the number of the iron core pieces 40 to be taken per unit area by arranging in this way. The first region A1 and the second region A2 are divided by the reference line K1, and the first iron core piece 40A and the second iron core piece 40B are respectively punched out.

Therefore, it is possible to simultaneously form the first iron core piece 40A and the second iron core piece 40B by a single die configuration from the single band plate 50. It is possible to increase the number of the iron core pieces 40 to be taken in a region by dividing the region in which the first iron core piece 40A and the second iron core piece 40B are punched out. Therefore, it is possible to manufacture the iron core piece 40 at low cost.

The reference line K1 preferably overlaps with at least a portion of the first iron core piece 40A and the second iron core piece 40B which are punched out from the first region A1 and the second region A2. Therefore, it is possible to intricately dispose the first iron core piece 40A and the second iron core piece 40B at a boundary between the first region A1 and the second region A2, and it is possible to increase the number of the iron core pieces 40 taken out from the band plate 50.

Next, a step (second step) of forming the laminated iron core 30 will be described. First, as illustrated in FIG. 2, the iron core pieces 40 are laminated in the plate thickness direction. In this case, the first iron core pieces 40A are laminated to form the first laminated iron core 30A and the second iron core pieces 40B are laminated to form the second laminated iron core 30B. That is, the iron core pieces 40 are laminated while aligning the direction of the inclination k of the rolling direction R1 with respect to the tooth direction T.

In addition, in the laminating step, the iron core pieces 40 are laminated with the punching directions thereof aligned with each other. Therefore, burrs of the iron core pieces 40 which are generated at the time of punching are not stacked facing each other and a gap is unlikely to be generated between the iron core pieces 40.

The caulking holes 49 in each iron core piece 40 are fitted to each other when the iron core pieces 40 are laminated. Furthermore, the iron core pieces 40 are caulked in the caulking holes 49 to be fixed. Therefore, the laminated iron core pieces are coupled. Moreover, a method of coupling the iron core pieces 40 to each other is not limited to the caulking and a unit such as adhesion or laser welding may be used.

Next, a step (third step) of forming the stator iron core 22 will be described. First, as illustrated in FIG. 1, the first laminated iron core 30A and the second laminated iron core 30B are arranged alternately in the circumferential direction. That is, a pair of the laminated iron cores 30 arranged at positions adjacent to each other in the circumferential direction are arranged so that the inclinations k are opposite to each other.

Figure 4:
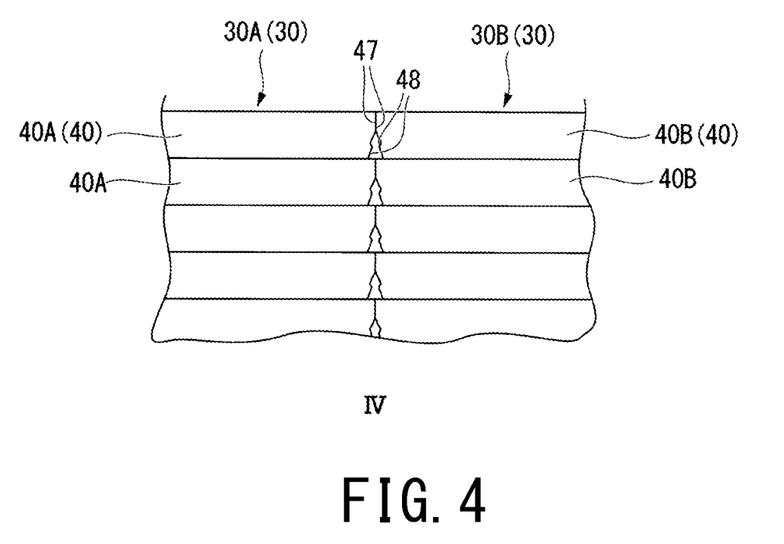
FIG. 4 is an arrow view which is viewed from arrow IV in FIG. 1.

Next, the adjacent laminated iron cores 30 are joined by welding at end surfaces 32a and 32b of the core back portion 32 in the circumferential direction. FIG. 4 is an arrow view which is viewed from arrow IV in FIG. 1 and a view illustrating a state before welding. As illustrated in FIG. 4, shearing surfaces 47 and fracture surfaces 48 are respectively formed along a punching direction on circumferential end surfaces of the laminated iron core pieces 40.

In general, the shearing surface and the fracture surface are formed along the punching direction in the order on the circumferential end surface of a plate material in which punching is performed. The shearing surface is a smooth surface, whereas the fracture surface is a concave-convex surface as if a material is torn off. Such a fracture surface may result in insufficient bonding strength in a case where joining is performed by welding.

In the present preferred embodiment, the first iron core piece 40A and the second iron core piece 40B are punched from the same direction. Therefore, in the first laminated iron core 30A and the second laminated iron core 30B, positions of the shearing surface 47 and the fracture surface 48 coincide with each other. Therefore, a strong welding bond is performed between the shearing surfaces 47 and sufficient bonding strength is able to be obtained.

The coil 21 is wound around the tooth portion 31 of the stator iron core 22 manufactured by the above steps via the insulator 23 to form the stator 20. Furthermore, the rotor 10 is disposed on an inside of the stator 20 in the radial direction so that the motor 1 is able to be manufactured.

According to the manufacturing method of the motor 1 of the present preferred embodiment, the first iron core piece 40A and the second iron core piece 40B, of which the inclinations of the tooth directions T are opposite to each other with respect to the rolling direction R1, are punched from the single band plate 50, so that the motor 1 is able to be manufactured at low cost. In addition, the first iron core piece 40A and the second iron core piece 40B is able to be laminated with the same punching direction aligned, and when the laminated iron cores 30 are welded and joined to each other, the positions of the shearing surfaces 47 in the laminating direction coincide with each other so as to be firmly joined.

Figure 5:
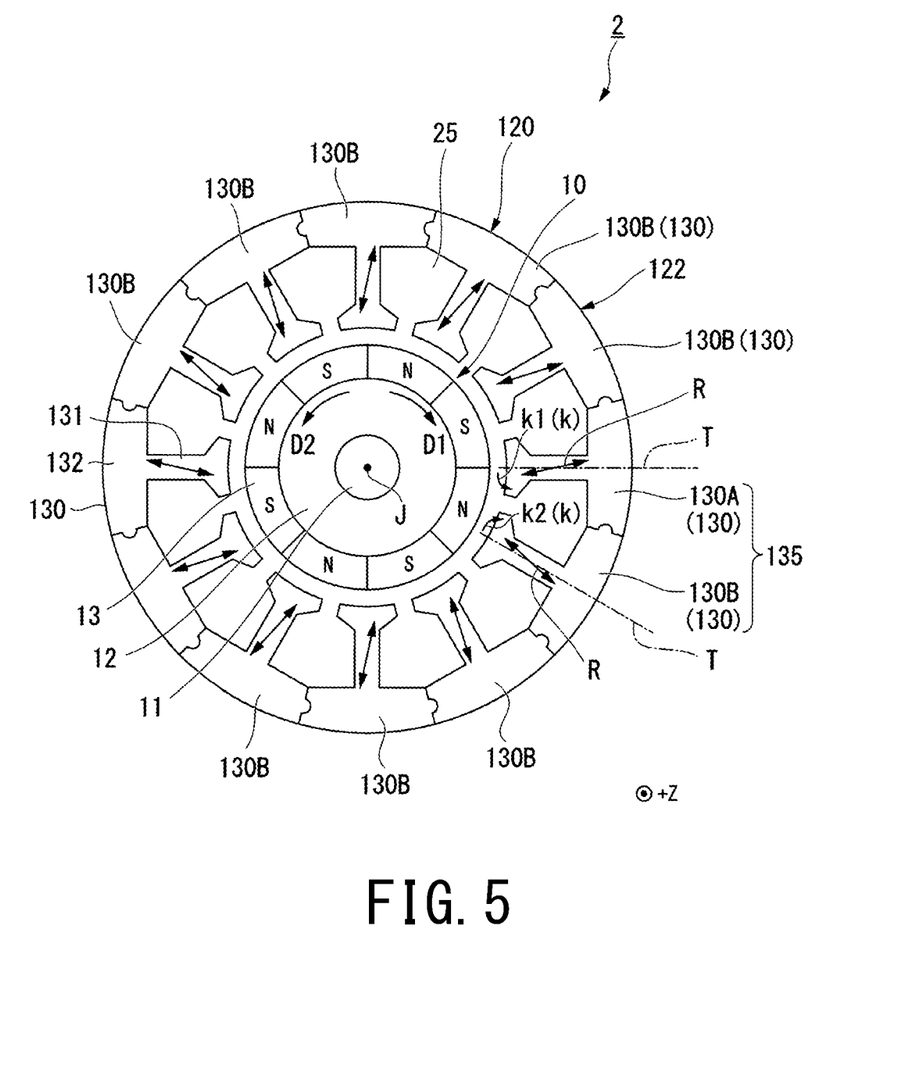
FIG. 5 is a schematic sectional view of a motor of Modification example 1 of a preferred embodiment of the present invention.

Next, a motor 2 of Modification example 1 of a preferred embodiment of the present invention will be described. FIG. 5 is a schematic sectional view of the motor 2 of Modification example 1. Moreover, in FIG. 5, a coil and an insulator are omitted for the sake of simplicity. Moreover, the same reference numerals are given to configuration elements of the same aspect as those of the motor 1 of the preferred embodiments described above, and the description thereof will be omitted.

Similar to the motor 1, the motor 2 is preferably an inner rotor brushless motor of 8 poles and 12 slots. The motor 2 has a different configuration in inclinations k of easy magnetization directions R of a plurality of laminated iron cores 130 with respect to tooth directions T compared to the motor 1 described above.

The motor 2 includes a stator 120 including a stator iron core 122, an insulator 23 (see FIG. 1), and a coil 21 (see FIG. 1).

The stator iron core 122 preferably includes twelve laminated iron cores 130 arranged in the circumferential direction. Each of the laminated iron cores 130 includes a core back portion 132 extending in the circumferential direction, and a tooth portion 131 extending from the core back portion 132 to the inside in the radial direction. Similar to the laminated iron core 30 described above, the laminated iron core 130 is defined by laminating the iron core pieces and has an easy magnetization direction R defined by the rolling direction of the iron core piece.

The twelve laminated iron cores 130 defining the stator iron core 122 respectively have the easy magnetization direction R. The twelve laminated iron cores 130 are classified into one first laminated iron core 130A and eleven second laminated iron cores 130B. In the first laminated iron core 130A and the second laminated iron core 130B, the inclination k of the easy magnetization direction R with respect to the radial direction is different. The inclination k in the first laminated iron core 130A is a first inclination k1 and the inclination k in the second laminated iron core 130B is a second inclination k2.

As illustrated in FIG. 5, the stator iron core 122 preferably includes a laminated iron cores pair 135. In the laminated iron core pair 135, the first laminated iron core 130A and the second laminated iron core 130B are adjacent to each other.

In the laminated iron core pair 135, the first laminated iron core 130A and the second laminated iron core 130B have the easy magnetization directions R which are inclined from a base side to a tip side of the tooth portion 131 toward the other side. That is, a pair of the laminated iron cores 130A and 130B adjacent to each other in the circumferential direction has the inclinations k opposite to each other.

In the motor 2 of the modification example, among the plurality of the laminated iron cores 130, the number of the first laminated iron cores 130A of which the inclination k is one side (first inclination k1) is larger than the number of the second laminated iron cores 130B of which the inclination k is the other side (second inclination k2). Therefore, in a case where the N pole or the S pole of the rotor 10 rotates in a first rotation direction D1 and approaches the second laminated iron core 130B, the magnetic flux emitted from the N pole or the S pole can smoothly pass through the tooth portion 131 of the second laminated iron core 130B and the magnetic discontinuity is reduced. Therefore, in the motor 2 of the modification example, the number of the second laminated iron cores 130B having the second inclination k2 is increased, so that in a case where the rotor 10 rotates in the first rotation direction D1, it is possible to reduce the torque ripple and similarly, to reduce the cogging torque. According to the modification example, it is possible to provide a motor which is useful in a case where it is used for an application in which the rotor 10 is rotated in the first rotation direction D1 with high frequency.

In addition, a torque of the motor 2 is a sum of torques generated by the coils wound around the respective laminated iron cores 130. Therefore, the sum of pulsations of the torques generated by the respective coils becomes the torque ripple of the motor 2 as a whole. If only the laminated iron core 130 having the inclination k on one side is arranged, peaks of pulsations overlap and there is a concern that the torque ripple also becomes large. According to the modification example, the peak of the pulsation is shifted and it is possible to further enhance a torque reduction effect of the torque ripple and the cogging torque by adding the first laminated iron core 130A while increasing the number of the second laminated iron core 130B among the plurality of the laminated iron cores 130.

Figure 6:
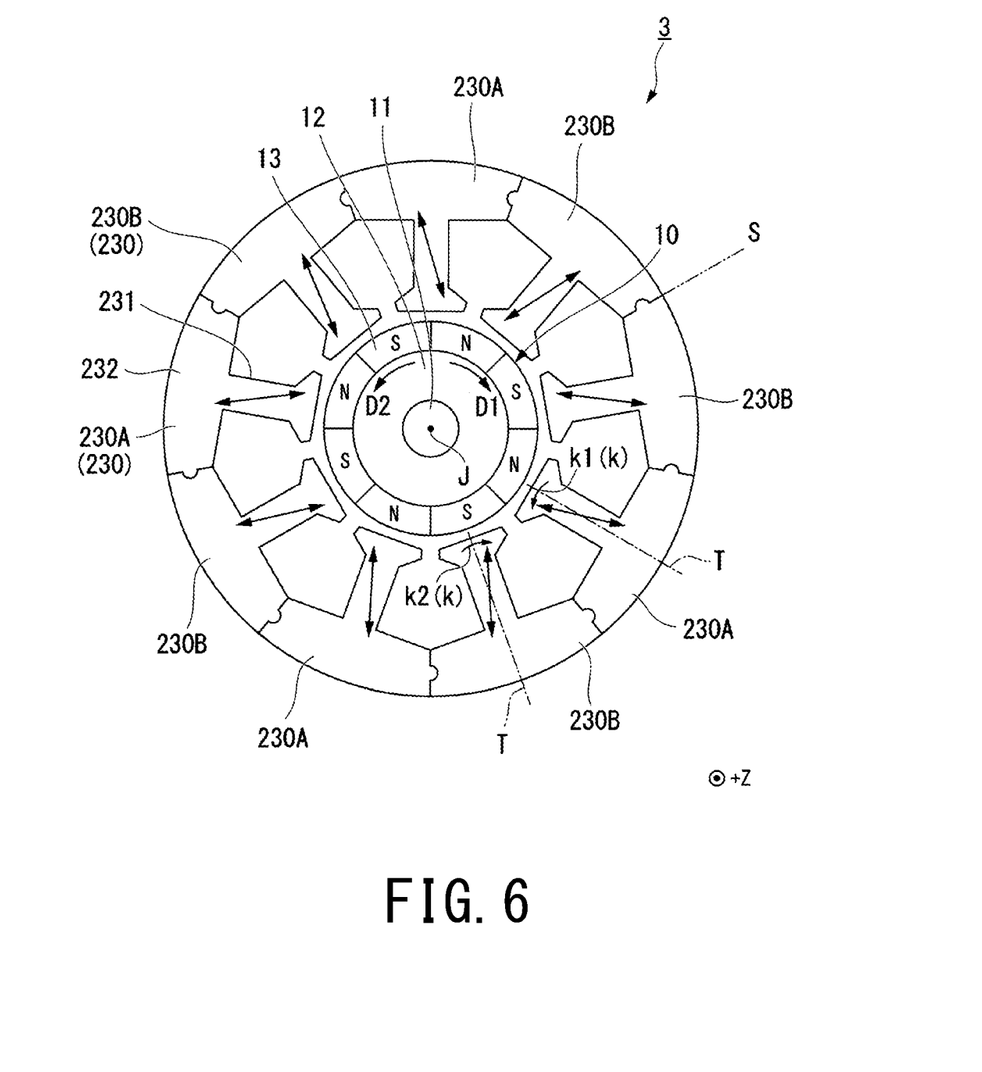
FIG. 6 is a schematic sectional view of a motor of Modification example 2 of a preferred embodiment of the present invention.

Next, a motor 3 of Modification example 3 of a preferred embodiment of the present invention will be described. FIG. 6 is a schematic sectional view of the motor 3 of the modification example. Moreover, in FIG. 6, a coil and an insulator are omitted for the sake of simplicity. Moreover, the same reference numerals are given to configuration elements of the same aspect as those of the motor 1 described above, and the description thereof will be omitted The motor 3 is preferably an inner rotor brushless motor including 8 poles and 9 slots, for example. The motor 3 has a different configuration in the number of laminated iron cores 230 and inclinations k of easy magnetization directions R with respect to tooth directions T compared to the motor 1 described above.

The motor 3 includes a stator 220 preferably including a stator iron core 222, an insulator 23 (see FIG. 1), and a coil 21 (see FIG. 1).

The stator iron core 222 preferably includes nine laminated iron cores 230 arranged in the circumferential direction, for example. That is, the number of the laminated iron cores 230 preferably is an odd number. Each of the laminated iron cores 230 includes a core back portion 232 extending in the circumferential direction, and a tooth portion 231 extending from the core back portion 232 to the inside in the radial direction. Similar to the laminated iron core 30 described above, the laminated iron core 230 is formed by laminating the iron core pieces and has an easy magnetization direction R defined by the rolling direction of the iron core piece.

The nine laminated iron cores 230 configuring the stator iron core 222 respectively have the easy magnetization direction R. The nine laminated iron cores 230 are classified into four first laminated iron cores 230A and five second laminated iron cores 230B. In the first laminated iron core 230A and the second laminated iron core 230B, the inclination k of the easy magnetization direction R with respect to the radial direction is different. That is, the first laminated iron core 230A has a first inclination k1 and the second laminated iron core 230B has a second inclination k2.

As illustrated in FIG. 6, the first laminated iron core 230A and the second laminated iron core 230B are arranged alternately from a starting point S in the circumferential direction. In the present preferred embodiment, since the number of the laminated iron cores 230 is an odd number, the second laminated iron cores 230B having the second inclinations k2 in the same direction are positioned on both sides sandwiching the starting point S.

Similar to the motor 1 described above, in the motor 3 of the modification example, the first laminated iron core 230A and the second laminated iron core 230B are disposed alternately in the circumferential direction, so that it is possible to reduce the magnetic discontinuity, and the cogging torque and the torque ripple.

In addition, in the motor 3 of the modification example, since the number of the laminated iron cores 230 is the odd number, the number of the second laminated iron cores 230B of which the inclination k is the other side (second inclination k2) is larger than the number of the first laminated iron cores 230A of which the inclination k is one side (first inclination k1). Therefore, in a case where the rotor 10 rotates in the first rotation direction D1, it is possible to effectively reduce the torque ripple. Therefore, it is possible to provide the motor 3 which is useful in a case where it is used for an application in which the rotor 10 is rotated in the first rotation direction D1 with high frequency.

Figure 7:
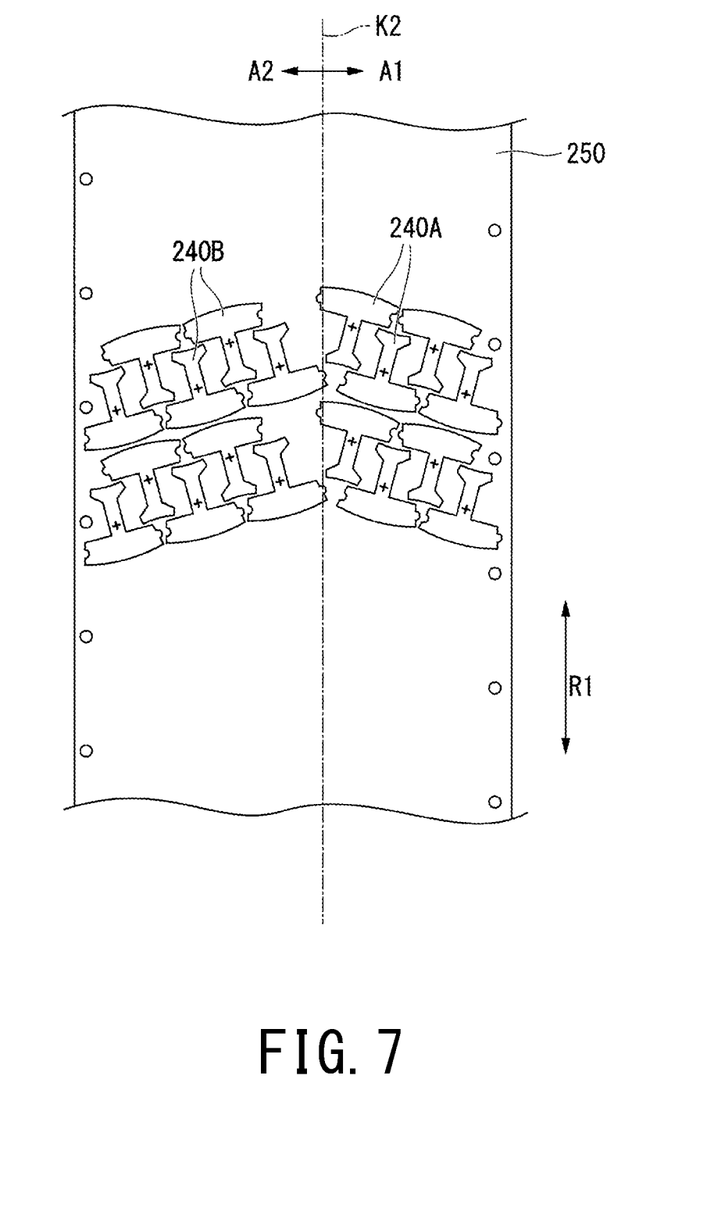
FIG. 7 is a schematic view illustrating an example of a die configuration used in punching an iron core piece of Modification example 2 of a preferred embodiment of the present invention.

Next, a step (first step) of forming a first iron core piece 240A configuring the first laminated iron core 230A and a second iron core piece 240B configuring the second laminated iron core 230B of the motor 3 of the modification example will be described. FIG. 7 is a schematic view illustrating an example of a die configuration when the first iron core piece 240A and the second iron core piece 240B are punched out from a band plate 250. As illustrated in FIG. 7, the band plate 250 is provided with a reference line K2 extending in a longitudinal direction (that is, in a rolling direction) of the band plate 250. The reference line K2 is disposed to be biased toward one side (right side of a paper surface of FIG. 7) of the band plate 250 in the width direction. The reference line K2 divides the band plate 250 into a first region A1 on one side in the width direction and a second region A2 on the other side in the width direction.

A plurality of the first iron core pieces 240A are punched out from the first region A1 and a plurality of the second iron core pieces 240B are punched out from the second regions A2. The second region A2 is wider than the first region A1 and the number of the second iron core pieces 240B punched out from the second region A2 is larger than the number of the first iron core pieces 240A punched out from the first region A1. As described above, the position of the reference line K2 is biased to one side, so that it is possible to obtain the necessary number of the first iron core pieces 240A and the second iron core pieces 240B having different inclinations k from the single band plate 250.

Although the preferred embodiments and the modification examples of the present disclosure are described above, the respective configurations in the preferred embodiments, combinations thereof, and the like are merely examples, and additions, omissions, substitutions, combinations, and other changes of configurations are possible without departing from the spirit of the present disclosure.

For example, in the preferred embodiments described above, the stator preferably includes insulators, but insulators may not be provided if so desired. In this case, it is preferable that an insulating coating is provided on the stator iron core.

In addition, in the preferred embodiments described above, an inner rotor brushless motor is provided, but the same configuration can be adopted for an outer rotor motor.

Figure 8:
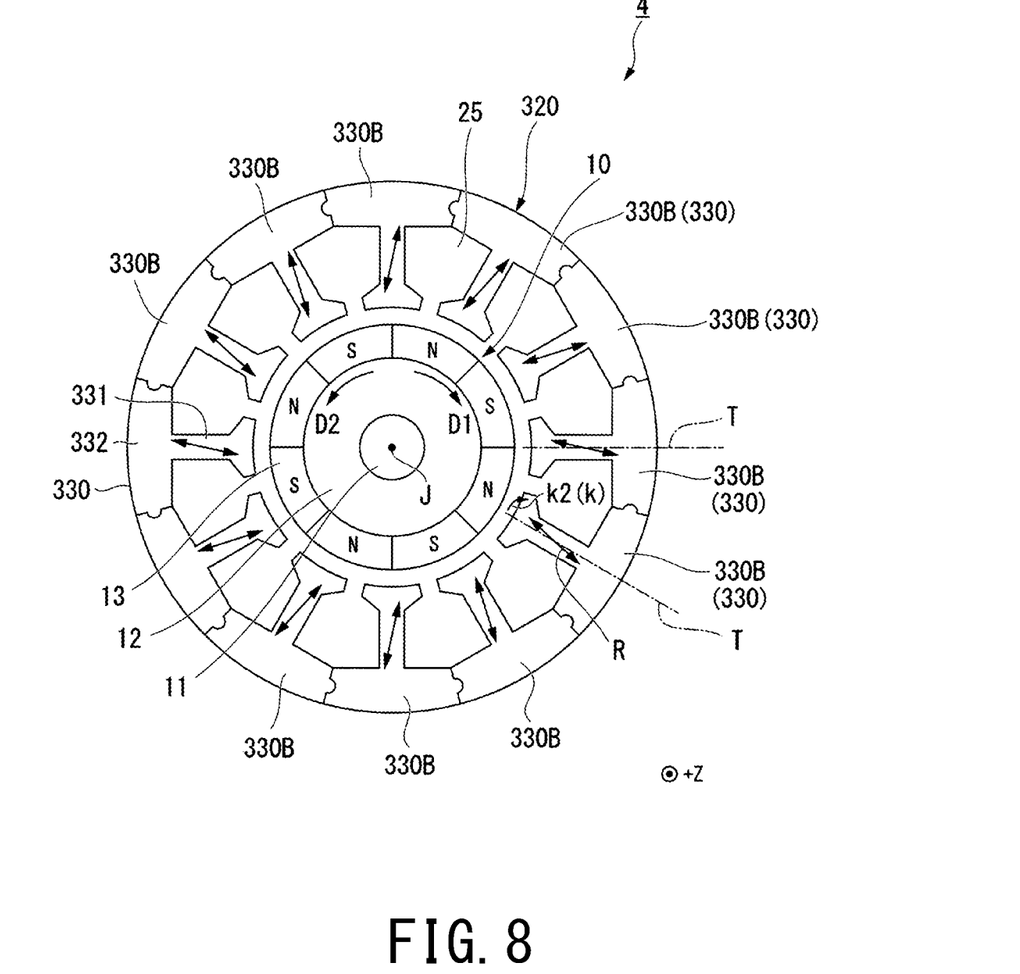
FIG. 8 is a schematic sectional view of a motor of Modification example 3 of a preferred embodiment of the present invention.

In addition, as illustrated in FIG. 8, if a motor 4 includes only second laminated iron cores 330B of which inclinations k of easy magnetization directions R of all laminated iron cores 330 are the other side (the second inclination k2), in a case where the rotor 10 is used to rotate only in a first rotation direction D1, the disclosure in which it is possible to obtain reduction effect of the cogging torque and the torque ripple, can be created. Similarly, in a case where a motor includes only the first laminated iron cores of which the inclination k is one side (first inclination k1), in a case where the rotor 10 is used to rotate only in a second rotation direction D2, it is possible to obtain reduction effect of the cogging torque and the torque ripple.

According to the motor 4 of the modification example of a preferred embodiment of the present invention, the inclinations k of all the laminated iron cores 330 become directions opposite to the rotation direction of the rotor 10, so that when the N pole of the rotor 10 passes through a coil 21, the magnetic flux penetrating the coil 21 gently fluctuates and the magnetic discontinuity is able to be reduced. Therefore, it is possible to obtain the reduction effect of the cogging torque and the torque ripple.

The motor 4 includes a rotor 10 that rotates centered on a central axis J, an annular stator 320 that faces the rotor 10, and a housing that accommodates the rotor 10 and the stator. The stator 320 includes an annular core back portion 332 and a plurality of tooth portions 331 that extends from the core back portion 332 in the radial direction. The stator 320 is defined by the iron core pieces 40 (see FIG. 2) obtained by laminating the non-oriented electromagnetic steel plates, the non-oriented electromagnetic steel plate has the easy magnetization direction to one side, and a characteristic thereof is that the inclination of the easy magnetization direction is the same for each tooth portion 331.

Figure 9:
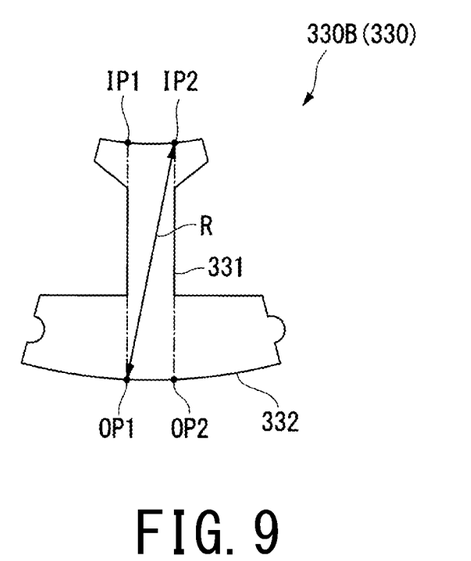
FIG. 9 is a plan view of a laminated iron core of a motor of Modification example 3 of a preferred embodiment of the present invention.

In addition, as illustrated in FIG. 9, a laminated iron core 330 of a stator 320 preferably includes intersection points IP1 and IP2 on an inside in the radial direction of an inner peripheral surface of a tooth portion 331 in the radial direction when a side surface of the tooth portion 331 extends on the inside in the radial direction. The tooth portion 331 includes intersection points OP1 and OP2 on an outside in the radial direction of an outer peripheral surface of a core back portion 332 in the radial direction when a side surface of a plurality of the tooth portions 331 around which copper wires are wound extend on the outside in the radial direction. The easy magnetization direction R is a direction connecting the intersection point on the inside in the radial direction of the inner peripheral surface of the tooth portion 331 in the radial direction and the intersection point on the outside in the radial direction with the core back portion 332 on a diagonal line. Moreover, the configuration of the easy magnetization direction R in the tooth portion 331 is not limited to the modification example, but may be applied to the preferred embodiments and each modification example described above.

In addition, the easy magnetization direction R is inclined in a direction in which the rotor 10 rotates with respect to a direction in which the tooth portion 331 extends.

With the configuration, since the easy magnetization direction R is inclined in the same direction in each tooth portion, the iron loss is able to be significantly reduced or prevented, magnetic saturation is able to be significantly reduced or prevented, and a reduction of the cogging torque and the torque ripple of the motor 4 is able to be realized.

In addition, the easy magnetization direction R is inclined from about 10° to about 45°, for example, in a direction in which the rotor 10 rotates with respect to a direction in which the tooth portion 331 extends.

According to the configuration, since the easy magnetization direction R is inclined from about 10° to about 45°, the iron loss is able to be significantly reduced or prevented and the reduction of the cogging torque and the torque ripple of the motor 4 is able to be realized. Particularly the reduction of the cogging torque is able to be realized.

The easy magnetization direction R may be inclined from about 25° to about 30°, for example, in the direction in which the rotor 10 rotates with respect to a direction in which the tooth portion 331 extends.

Figure 10:
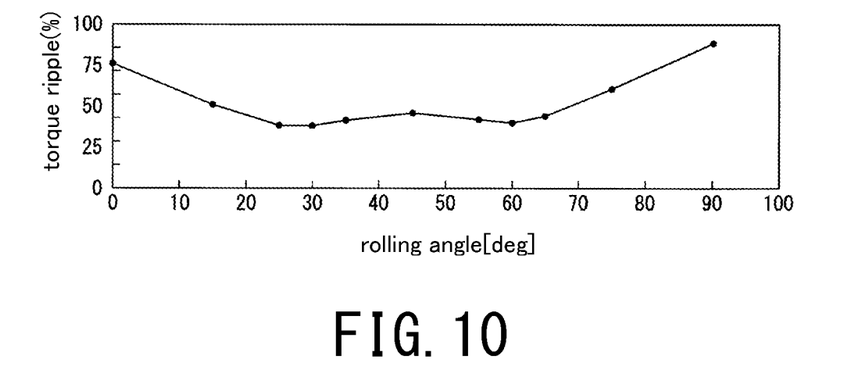
FIG. 10 is a graph illustrating a relationship between a rolling angle and a torque ripple in a motor of Modification example 3 of a preferred embodiment of the present invention.

According to such a configuration, the easy magnetization direction R is inclined from about 25° to about 35°, for example, so that the iron loss is able to be significantly reduced or prevented, the magnetic saturation is able to be significantly reduced or prevented, and the reduction of the cogging torque and the torque ripple of the motor 4 is able to be realized. FIG. 10 is a graph illustrating a change in the torque ripple in a case where a rolling angle (here, an inclined angle of the easy magnetization direction R with respect to the direction in which the tooth portion 331 extends) is changed. As illustrated in FIG. 10, according to the motor 4 having the configuration, the reduction of the torque ripple of the motor 4 is particularly realized. Moreover, such a configuration of the easy magnetization direction R is not limited to the modification example, but may be applied to the preferred embodiments and modification examples described above.

Figure 11:
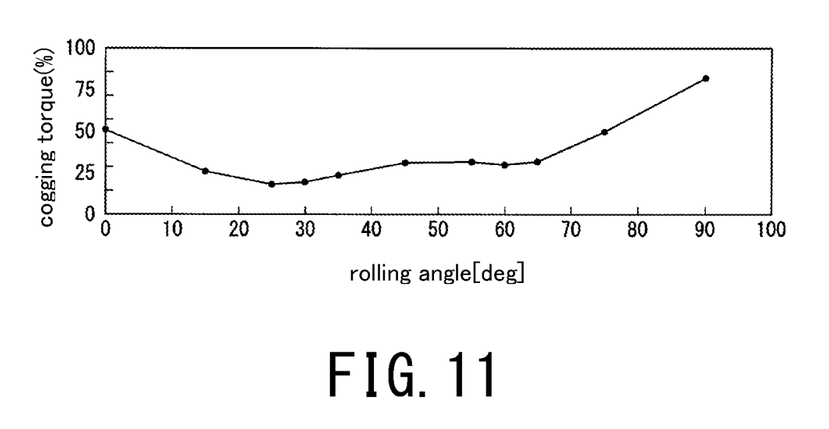
FIG. 11 is a graph illustrating a relationship between the rolling angle and a cogging torque in the motor of Modification example 3 of a preferred embodiment of the present invention.

The easy magnetization direction R may be inclined from about 20° to about 25°, for example, in the direction in which the rotor 10 rotates with respect to the direction in which the tooth portion 331 extends. According to the configuration, since the easy magnetization direction R is inclined from about 20° to about 25°, for example, the iron loss is able to be significantly reduced or prevented and the reduction of the cogging torque and the torque ripple of the motor 4 is able to be realized. FIG. 11 is a graph illustrating a change in the cogging torque in a case where a rolling angle is changed. As illustrated in FIG. 11, according to the motor 4 having the configuration, the reduction of the torque ripple of the motor 4 is particularly realized. Note that the configuration of such easy magnetization direction R is not limited to the modified example, and may be applied to the preferred embodiments and modification examples described above.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A motor comprising:
    a rotor that rotates centered on a central axis extending in an axial direction; and
    a stator, wherein
    the stator includes a stator iron wherein the stator iron core includes laminated iron cores, each of the laminated iron cores including a tooth portion extending in a radial direction are arranged in a circumferential direction, and coils are wound around the tooth portions,
    each of the laminated iron cores includes a plurality of flat plate-shaped iron core pieces laminated in a plate thickness direction,
    the flat plate-shaped iron core pieces are made of a non-oriented electromagnetic steel plate,
    a rolling direction of the flat plate-shaped iron core pieces is inclined with respect to the radial direction,
    the flat plate-shaped iron core pieces are laminated and arranged with a same inclination to define respective ones of the laminated iron cores, and
    at least a pair of the laminated iron cores adjacent to each other in the circumferential direction has inclinations opposite to each other.

2. The motor according to claim 1, wherein
    in the stator iron core, one of the laminated iron cores with an inclination towards one side and another one of the laminated iron cores with an inclination towards another side opposite to the one side are alternately arranged in the circumferential direction.

3. The motor according to claim 2, wherein a number of the laminated iron cores is an even number.

4. The motor according to claim 2, wherein a number of the laminated iron cores is an odd number.

5. The motor according to claim 1, wherein among the plurality of the laminated iron cores, a total number of the laminated iron cores with an inclination toward one side is larger than a total number of the laminated iron cores with an inclination toward a side opposite the one side.

6. The motor according to claim 3, wherein
    the stator iron core includes twelve laminated iron cores, and
    the rotor includes an eight-pole permanent magnet in the circumferential direction.

7. A manufacturing method of a motor including a rotor that rotates centered on a central axis extending in an axial direction and a stator including a stator iron core including a tooth portion extending in a radial direction and a coil wound around the tooth portion, the method comprising:
    a first step of punching a band plate made of a non-oriented electromagnetic steel plate to form a plurality of flat plate-shaped iron core pieces each including the tooth portion;
    a second step of laminating the iron core pieces in a plate thickness direction to form laminated iron cores; and
    a third step of arranging and joining the laminated iron cores in a circumferential direction to form a stator iron core, wherein
    in the first step, the iron core piece is punched from the band plate by inclining an extending direction of the tooth portion with respect to a rolling direction of the band plate,
    in the second step, the iron core pieces are laminated by aligning an inclination in the rolling direction with respect to the extending direction of the tooth portion, and
    in the third step, at least a pair of the laminated iron cores arranged in positions adjacent to each other in the circumferential direction is arranged such that the inclinations are opposite to each other.

8. The manufacturing method of a motor according to claim 7, wherein
    in the first step, a reference line, wherein the reference line extends in the rolling direction of the band plate and divides the band plate into a first region on one side in a width direction and a second region on the other side in the width direction, is provided, and
    in the first region and the second region, inclinations in an extending direction of the tooth portion with respect to the reference line are opposite to each other, and the iron core piece is punched from the band plate.

9. The manufacturing method of a motor according to claim 8, wherein the reference line overlaps with at least a portion of the iron core pieces in the iron core pieces punched from the first region and the second region.

10. The manufacturing method of a motor according to claim 8, wherein the reference line passes through a center of the band plate in the width direction.

11. The manufacturing method of a motor according to claim 8, wherein
    the reference line is biased to one side of the band plate in the width direction, and
    a number of the iron core pieces punched in the second region is larger than a number of the iron core pieces punched in the first region.

* * * * *